(12) United States Patent (10) Patent No.: US 9,025,926 B2
Chang et al. (45) Date of Patent: May 5, 2015

(54) SLOTTED Y-COUPLING WAVEGUIDE FOR SLOTTED WAVEGUIDE MODULATOR DEVICE

(75) Inventors: Peter L. Chang, Portland, OR (US); Jia-Hung Tseng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/581,720

(22) PCT Filed: Sep. 22, 2011

(86) PCT No.: PCT/US2011/052849
§ 371 (c)(1),
(2), (4) Date: Aug. 29, 2012

(87) PCT Pub. No.: WO2013/043183
PCT Pub. Date: Mar. 28, 2013

(65) Prior Publication Data
US 2014/0199015 A1 Jul. 17, 2014

(51) Int. Cl.
*G02B 6/10* (2006.01)
*G02B 6/136* (2006.01)
*G02F 1/313* (2006.01)
*G02B 6/122* (2006.01)
*G02B 6/125* (2006.01)
(Continued)

(52) U.S. Cl.
CPC ............ *G02F 1/3133* (2013.01); *G02B 6/1221* (2013.01); *G02B 6/125* (2013.01); *G02F 1/025* (2013.01); *G02F 1/065* (2013.01); *G02B 6/136* (2013.01)

(58) Field of Classification Search
USPC ................................................... 385/8, 9, 45
See application file for complete search history.

(56) References Cited

U.S. PATENT DOCUMENTS 5,138,687 A * 8/1992 Horie et al. .................... 385/129
7,113,676 B2 * 9/2006 Piede et al. ..................... 385/42
(Continued)

FOREIGN PATENT DOCUMENTS

EP 0758665 2/1997

OTHER PUBLICATIONS

International Preliminary Report on Patentability for PCT Application No. PCT/US11/52849, dated Apr. 3, 2014.
(Continued)

*Primary Examiner* — Michelle R Connelly
(74) *Attorney, Agent, or Firm* — Schwabe Williamson & Wyatt PC

(57) ABSTRACT

Embodiments of the present disclosure describe techniques and configurations for decreasing optical loss in a waveguide of a modulator device. In one embodiment, an apparatus includes a substrate, and a waveguide of a modulator device formed on the substrate, the waveguide having a first portion that is configured to receive light for propagation along the waveguide, a second portion that includes two slots formed in the waveguide that merge into a single slot, the second portion being coupled with the first portion, a third portion that includes the single slot formed in the waveguide, the third portion being coupled with the second portion, a fourth portion that includes another two slots formed in the waveguide, the another two slots branching from the single slot, the fourth portion being coupled with the third portion, and a fifth portion that is configured to output the propagated light, the fifth portion being coupled with the fourth portion. Other embodiments may be described and/or claimed.

20 Claims, 5 Drawing Sheets

(51) Int. Cl.
*G02F 1/025* (2006.01)
*G02F 1/065* (2006.01)

(56) References Cited

U.S. PATENT DOCUMENTS

| | | | | |
|---|---|---|---|---|
| 7,606,455 | B2 * | 10/2009 | Barrios et al. | 385/131 |
| 7,693,384 | B2 * | 4/2010 | Lee et al. | 385/132 |
| 7,972,522 | B2 * | 7/2011 | Jordana et al. | 216/17 |
| 8,300,990 | B2 * | 10/2012 | Li et al. | 385/2 |
| 8,340,486 | B1 * | 12/2012 | Hochberg et al. | 385/122 |
| 8,768,124 | B2 * | 7/2014 | Van Keuren et al. | 385/50 |
| 2003/0026523 | A1 | 2/2003 | Chua et al. | |
| 2009/0231686 | A1 | 9/2009 | Atkins et al. | |
| 2012/0027344 | A1 * | 2/2012 | Krijn et al. | 385/32 |
| 2012/0033294 | A1 * | 2/2012 | Beausoleil et al. | 359/341.3 |

OTHER PUBLICATIONS

International Search Report and Written Opinion mailed Apr. 27, 2012 from International Application No. PCT/US2011/052849.

* cited by examiner

SLOTTED Y-COUPLING WAVEGUIDE FOR SLOTTED WAVEGUIDE MODULATOR DEVICE

CROSS REFERENCE TO RELATED APPLICATIONS

The present application claims priority under 35 U.S.C. §365(a) to International Application No. PCT/US2011/052849, filed Sep. 22, 2011, entitled "SLOTTED Y-COUPLING WAVEGUIDE FOR SLOTTED WAVEGUIDE MODULATOR DEVICE," which designates the United States of America and at least one country other than the United States of America, the entire contents and disclosures of which are hereby incorporated by reference in their entirety.

FIELD

Embodiments of the present disclosure generally relate to the field of integrated circuits, and more particularly, to techniques and configurations for decreasing optical loss in a waveguide of a modulator device.

BACKGROUND

Waveguides may be used in modulator devices of optical interconnect systems to route light. Current waveguides may experience optical loss that may limit current waveguides from being used in emerging optical interconnect systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide techniques and configurations for decreasing optical loss in a waveguide of a modulator device. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. The term "coupled" may refer to a direct connection, an indirect connection, or an indirect communication.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
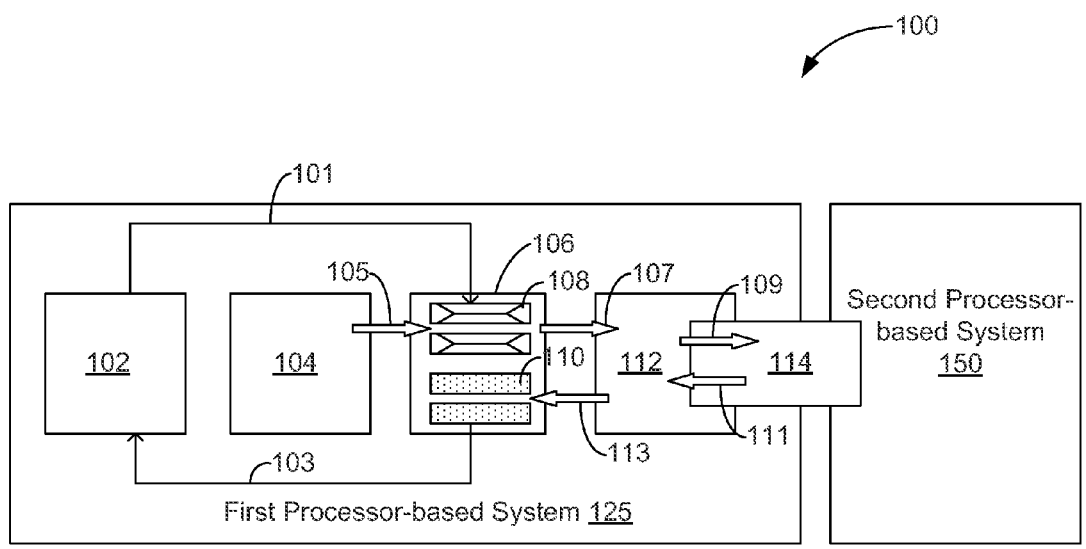
FIG. 1 schematically illustrates an example optical interconnect system that includes a modulator device having a slotted Y-coupling waveguide in accordance with some embodiments.

FIG. 1 schematically illustrates an example optical interconnect system 100 that includes a modulator device 108 having a slotted Y-coupling waveguide (e.g. waveguide 200 of FIG. 2) in accordance with some embodiments. The optical interconnect system 100 includes a first processor-based system 125 and a second processor-based system 150 coupled together using an optical routing component such as fiber 114 to route light or "optical mode" signals (e.g., light 109, 111) between the first processor-based system 125 and the second processor-based system 150.

The first processor-based system 125 may include a processor 102 that is configured to drive (e.g., indicated by arrow 101) one or more modulator devices (hereinafter "modulator device 108") of a planar lightwave circuit (PLC) 106. The modulator device 108 may include a slotted Y-coupling waveguide, hereinafter referred to as "waveguide" (e.g., the waveguide 200 of FIG. 2). The modulator device 108 is configured to modulate light 105 received from a light source 104. The light source 104 may be a laser light source in some embodiments. The modulated light 107 is output from the modulator device 108 to a connector element 112. The connector element 112 routes the light 109 from the modulator device 108 over the fiber 114 to the second processor-based system 150.

In some embodiments, the second processor-based system 150 sends light 111 over the fiber 114 to the first processor-based system 125. Although not shown, the second processor-based system 150 may be similarly equipped as the first processor-based system 125. The light 111 sent by the second processor-based system 150 may be received by the connector element 112 of the first processor-based system 125. The connector element 112 may route the light 113 to one or more detectors (hereinafter "detector 110"). The processor 102 is configured to process signals (e.g., indicated by arrow 103) based on the light 113 received at the detector 110.

The first processor-based system 125 and/or the second processor-based system 150 may include additional components in some embodiments. For example, the first processor-based system 125 and/or the second processor-based system 150 may comport with embodiments described in connection with the example processor-based system 500 of FIG. 5.

Figure 2:
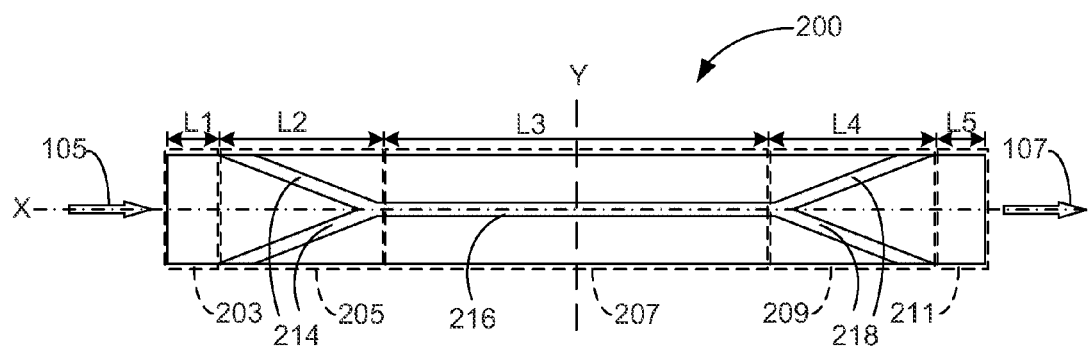
FIG. 2 schematically illustrates a slotted Y-coupling waveguide in accordance with some embodiments.

FIG. 2 schematically illustrates a slotted Y-coupling waveguide 200 in accordance with some embodiments. The waveguide 200 may be an optical path of a modulator device (e.g., the modulator device 108 of FIG. 1) for routing of light 105. In some embodiments, the modulator device may further include a substrate (e.g., substrate 360 of FIGS. 3A-C) underlying the waveguide 200 and an Electro-Optic (EO) polymer disposed on the waveguide 200 (e.g., the EO polymer 370 of FIGS. 3A-C), which are omitted in the top-down perspective of FIG. 2 for the sake of clarity.

The waveguide 200 may include a first portion 203, a second portion 205, a third portion 207, a fourth portion 209, and a fifth portion 211, each demarcated with a dashed line and coupled as shown. The first portion 203 may be configured to receive light 105 for propagation along the waveguide 200. A direction of light propagation through the waveguide 200 may be indicated by the arrows used to depict light 105 and 107. In some embodiments, the first portion 203 does not include a slot feature formed therein. The first portion 203 may have a length, L1, in the direction of light propagation that is greater than or equal to 10 microns in some embodiments. Other lengths for L1 can be used in other embodiments.

The second portion 205 may be directly coupled with the first portion 203. In some embodiments, the second portion 205 includes two slots 214 formed in material of the waveguide 200. The two slots 214 may merge into a single slot 216 to form a slotted Y-coupling feature, as can be seen. The two slots 214 may extend from opposing edges of the waveguide 200 and merge into the single slot 216. The two slots 214 of the second portion 205 may provide a gradual tapered transition from the first portion 203, which may not include a slot, to the single slot 216 of the third portion 207.

The two slots 214 may decrease optical loss or coupling loss in the waveguide 200. The Y-coupling feature formed by the two slots 214 may provide a lower mode perturbation route to transfer the optical mode or light 105 from the first portion 203 to the third portion 207. For example, an optical loss of the waveguide 200 may be about 1.5 decibel (dB) compared to an optical loss of 5.1 dB for a similar waveguide that does not include the Y-coupling feature formed by the two slots 214.

In some embodiments, the second portion 205 may have a length, L2, in the direction of light propagation that is greater than or equal to 50 microns. Increasing a length for L2 may decrease coupling loss of light 105 through the second portion 205. Decreasing a length for L2 may reduce cost associated with fabrication of a longer/larger waveguide. Other lengths for L2 can be used in other embodiments.

The third portion 207 may be directly coupled with the second portion 205. In some embodiments, the third portion 207 includes the single slot 216. In some embodiments, the third portion 207 may have a length, L3, in the direction of light propagation that is greater than or equal to 200 microns in other embodiments. Other lengths for L3 can be used in other embodiments.

The fourth portion 209 may be directly coupled with the third portion 207. In some embodiments, the fourth portion 209 includes two slots 218 formed in material of the waveguide 200. The two slots 218 may branch out from the single slot 216 and extend to opposing edges of the waveguide 200 to form another slotted Y-coupling feature, as can be seen. The two slots 218 of the fourth portion 209 may provide a gradual tapered transition from the third portion 207, which includes the single slot 216, to the fifth portion 211.

The two slots 218 may decrease optical loss or coupling loss in the waveguide 200. The Y-coupling feature formed by the two slots 218 may provide a lower mode perturbation route to transfer the optical mode or light 105 from the third portion 207 to the fifth portion 211.

In some embodiments, the fourth portion 209 may have a length, L4, in the direction of light propagation that is greater than or equal to 50 microns. Increasing a length for L4 may decrease coupling loss of light 105 through the fourth portion 209. Decreasing a length for L4 may reduce cost associated with fabrication of a longer/larger waveguide. Other lengths for L4 can be used in other embodiments.

The fifth portion 211 may be directly coupled with the fourth portion 209. In some embodiments, the fifth portion 211 may be configured to output the propagated light 107 from the waveguide 200. The fifth portion 211 may not include any slot feature formed therein. The fifth portion 211 may have a length, L5, in the direction of light propagation that is greater than or equal to 10 microns in some embodiments. Other lengths for L5 can be used in other embodiments.

In various embodiments, the two slots 214 are symmetric to one another across a first imaginary line, X, that extends in the direction of light propagation in the waveguide 200. The two slots 218 may be symmetric to one another across the first imaginary line X. The single slot 216 may be parallel to the first imaginary line X. In some embodiments, the two slots 214 and the two slots 218 are symmetric to one another across a second imaginary line, Y, that is perpendicular to the first imaginary line X, as can be seen.

Figure 3A:
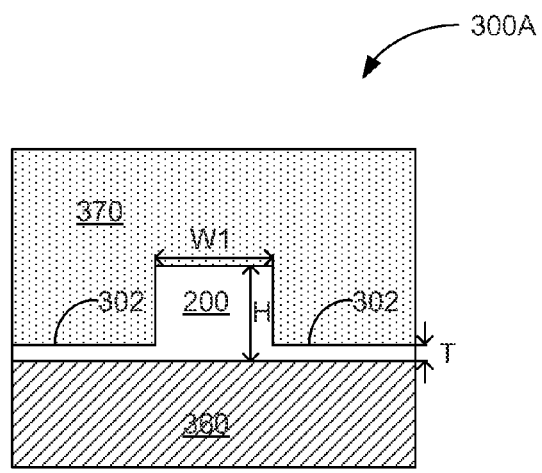
FIGS. 3A-3C schematically illustrate cross-section views of a modulator device including a slotted Y-coupling waveguide in accordance with some embodiments.
Figure 3B:
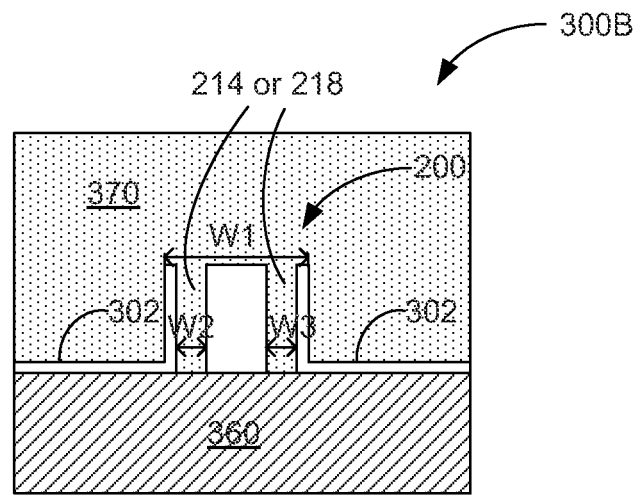
Figure 3C:
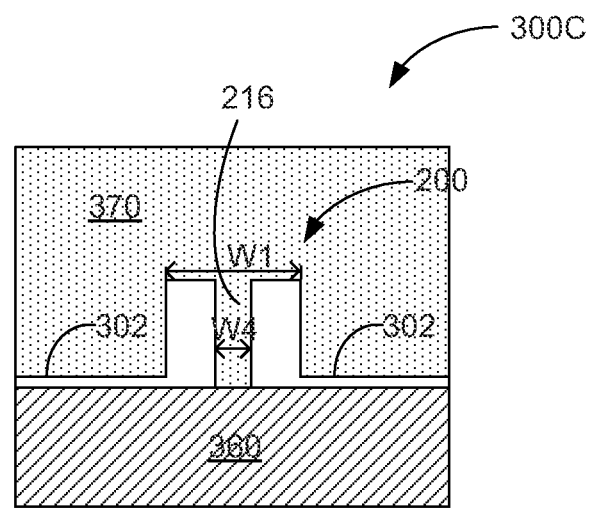

FIGS. 3A-3C schematically illustrate cross-section views 300A, 300B, 300C of a modulator device (e.g., the modulator device 108 of FIG. 1) including a slotted Y-coupling waveguide 200 ("waveguide 200") in accordance with some embodiments. Referring to both FIG. 3A and FIG. 2, cross-section view 300A represents a cross-section view of the modulator device through the first portion 203 and/or the fifth portion 211 of the waveguide 200 cut along a direction that is parallel to the second imaginary line Y. The cross-section view 300A of the modulator device includes the waveguide 200 formed on the substrate 360, a layer 302 of doped semiconductor material formed on the substrate 360, and an Electro-Optic (EO) polymer 370 formed on the waveguide 200, as can be seen.

The substrate 360 may be composed of a dielectric material such as, for example, silicon oxide ($SiO_2$). Other suitable materials can be used to fabricate the substrate 360 in other embodiments.

The layer 302 may be composed of a semiconductor material such as, for example, silicon (Si), that is doped with an impurity to alter electrical properties of the semiconductor material. The layer 302 may have a thickness, T, of about 50 nanometers in some embodiments. The layer 302 may be composed of other suitable materials and/or have other thicknesses in other embodiments.

The waveguide 200 may be composed of a semiconductor material such as, for example, silicon. Opposing edges on a top portion of the waveguide may be separated by a width, W1, ranging from 400 to 500 nanometers in some embodiments. The waveguide 200 may have a height, H, of about 100 to 300 nanometers in some embodiments. The waveguide 200 may be composed of other suitable materials and have other values for the width W1 and height H in other embodiments.

The EO polymer 370 may be formed to substantially encapsulate the waveguide 200. The EO polymer 370 may be composed of any suitable material.

Referring to both FIG. 3B and FIG. 2, cross-section view 300B represents a cross-section view of the modulator device through the second portion 205 and/or the fourth portion 209 of the waveguide 200 cut along a direction that is parallel to the second imaginary line Y. The cross-section view 300B of the modulator device includes two slots 214 or 218 formed in the waveguide 200, as can be seen. In some embodiments, the two slots 214 or 218 are filled with Electro-Optic polymer material of the EO polymer 370. The two slots 214 or 218 may extend from a top portion of the waveguide 200 to the substrate 360 in some embodiments. Each of the two slots 214 or 218 have a width (e.g., W2 and W3) that may range from 50 to 150 nanometers. The widths W2 and W3 of each of the two slots 214 or 218 can have other values in other embodiments.

Referring to both FIG. 3C and FIG. 2, cross-section view 300C represents a cross-section view of the modulator device through the third portion 207 of the waveguide 200 cut along a direction that is parallel to the second imaginary line Y. The cross-section view 300C of the modulator device includes single slot 216 formed in the waveguide 200, as can be seen. In some embodiments, the single slot 216 is filled with Electro-Optic polymer material of the EO polymer 370. The single slot 216 may extend from a top portion of the waveguide 200 to the substrate 360 in some embodiments. The single slot 216 may have a width, W4, that may range from 50 to 150 nanometers. The width W4 of the single slot 216 can have other values in other embodiments. In some embodiments, the width W4 and the widths W2 and W3 of FIG. 3B are the same. The single slot 216 of FIG. 3C and the slots 214 or 218 of FIG. 3B may have a height that is the same as the height H of the waveguide 200 in FIG. 3A in some embodiments.

Figure 4:
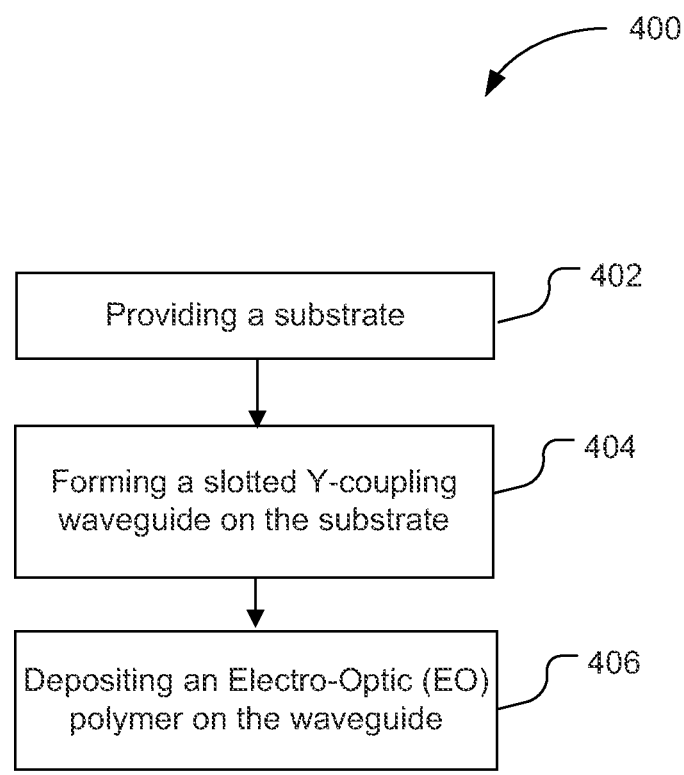
FIG. 4 is a flow diagram for a method of fabricating a modulator device including a slotted Y-coupling waveguide in accordance with some embodiments.

FIG. 4 is a flow diagram for a method 400 of fabricating a modulator device (e.g., modulator device 108 of FIG. 1) including a slotted Y-coupling waveguide (e.g., the waveguide 200 of FIG. 2) in accordance with some embodiments. At 402, the method 400 includes providing a substrate (e.g., substrate 360 of FIGS. 3A-C). The substrate may comport with embodiments already described herein.

At 404, the method 400 further includes forming a slotted Y-coupling waveguide ("waveguide") of a modulator device on the substrate. The waveguide may be formed by depositing a semiconductor material on the substrate using any suitable deposition process including, for example, chemical vapor deposition (CVD), physical vapor deposition (PVD), and atomic layer deposition (ALD) techniques. Portions of the deposited semiconductor material may be removed using, for example, patterning processes such as lithography and/or etch processes to selectively remove material to form the waveguide. The deposited semiconductor material may be patterned and doped (e.g., using an implant process) to form a layer (e.g., the layer 302 of FIGS. 3A-C) of doped semiconductor material adjacent to the waveguide. Slots (e.g., two slots 214, single slot 216, and/or two slots 218 of FIG. 2) may be formed in the waveguide using, for example, a patterning process that includes an anisotropic etch process that selectively removes semiconductor material of the waveguide in regions where the slots are formed.

At 406, the method 400 further includes depositing an EO polymer (e.g., the EO polymer 370 of FIGS. 3A-C) on the waveguide. In some embodiments, the EO polymer is deposited to substantially fill the slots formed in the waveguide and encapsulate the waveguide. The EO polymer may be deposited using any suitable process.

Figure 5:
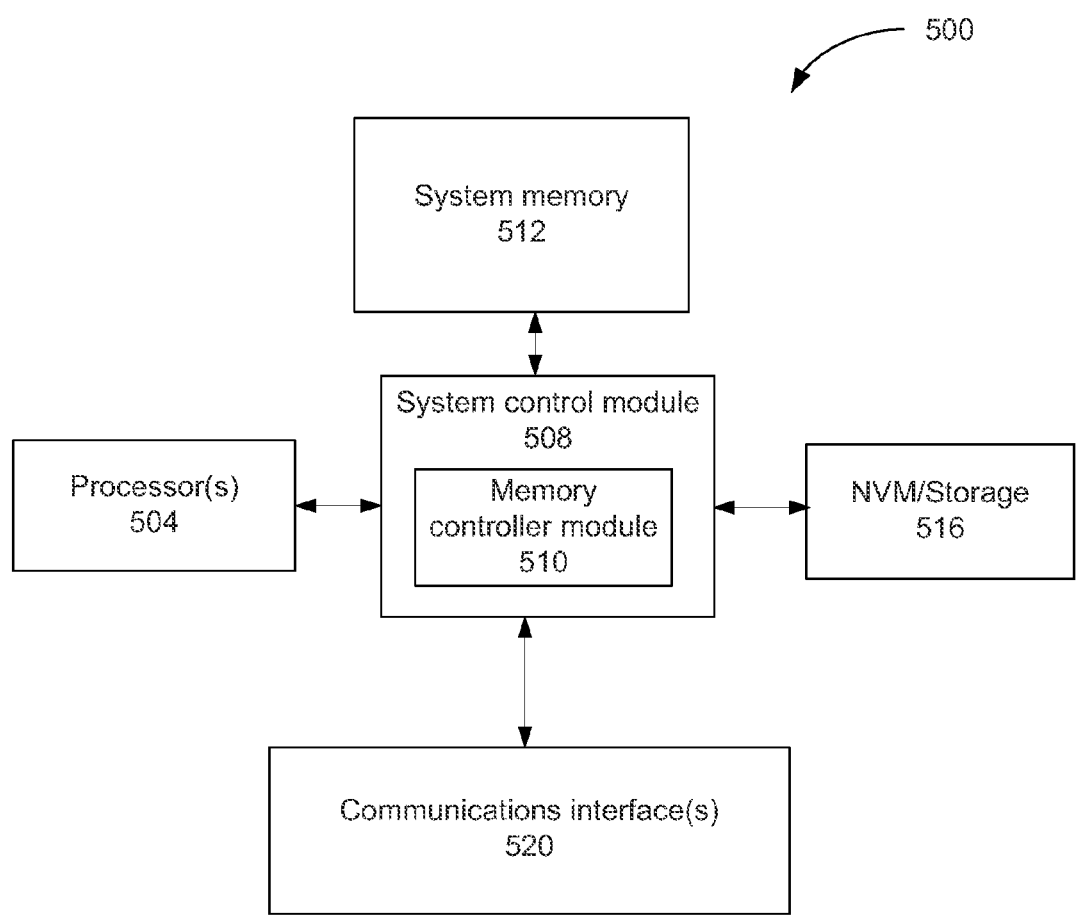
FIG. 5 schematically illustrates an example processor-based system that may be part of an optical interconnect system described herein in accordance with some embodiments.

Embodiments of the present disclosure may be implemented into a system using any suitable hardware and/or software to configure as desired. FIG. 5 schematically illustrates an example processor-based system 500 that may be part of an optical interconnect system described herein in accordance with some embodiments. For example, the example processor-based system 500 may represent the first processor-based system 125 and/or the second processor-based system 150 of the optical interconnect system 100 in FIG. 1. In one embodiment, the system 500 includes one or more processor(s) 504. One of the one or more processor(s) 504 may correspond with the processor 102 of FIG. 1.

The system 500 may further include system control module 508 coupled to at least one of the processor(s) 504, system memory 512 coupled to system control module 508, non-volatile memory (NVM)/storage 516 coupled to system control module 508, and one or more communications interface(s) 520 coupled to system control module 508.

System control module 508 for one embodiment may include any suitable interface controllers to provide for any suitable interface to at least one of the processor(s) 504 and/or to any suitable device or component in communication with system control module 508.

System control module 508 may include a memory controller module 510 to provide an interface to system memory 512. The memory controller module 510 may be a hardware module, a software module, and/or a firmware module.

System memory 512 may be used to load and store data and/or instructions, for example, for system 500. System memory 512 for one embodiment may include any suitable volatile memory, such as suitable DRAM, for example.

System control module 508 for one embodiment may include one or more input/output (I/O) controller(s) to provide an interface to NVM/storage 516 and communications interface(s) 520.

The NVM/storage 516 may be used to store data and/or instructions, for example. NVM/storage 516 may include any suitable non-volatile memory, such as PCM or flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the communications interface(s) 520.

Communications interface(s) 520 may provide an interface for system 500 to communicate over one or more wired or wireless network(s) and/or with any other suitable device.

For one embodiment, at least one of the processor(s) 504 may be packaged together with logic for one or more controller(s) of system control module 508, e.g., memory controller module 510. For one embodiment, at least one of the processor(s) 504 may be packaged together with logic for one or more controllers of system control module 508 to form a System in Package (SiP). For one embodiment, at least one of the processor(s) 504 may be integrated on the same die with logic for one or more controller(s) of system control module 508. For one embodiment, at least one of the processor(s) 504 may be integrated on the same die with logic for one or more controller(s) of system control module 508 to form a System on Chip (SoC).

In various embodiments, the system 500 may be, but is not limited to, a server, a workstation, a radio base station, a desktop computing device, an active cable, or a mobile computing device (e.g., a laptop computing device, a handheld computing device, a handset, a tablet, a smartphone, a netbook, etc.). In various embodiments, the system 500 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
   a substrate; and
   a waveguide of a modulator device formed on the substrate, the waveguide having:
     a first portion that is configured to receive light for propagation along the waveguide,
     a second portion that includes first two slots formed in the waveguide that merge into a single slot, the second portion being coupled with the first portion,
     a third portion that includes the single slot formed in the waveguide, the third portion being coupled with the second portion,
     a fourth portion that includes second two slots formed in the waveguide, the second two slots branching from the single slot, the fourth portion being coupled with the third portion, and
     a fifth portion that is configured to output the propagated light, the fifth portion being coupled with the fourth portion.

2. The apparatus of claim 1, wherein the substrate includes a dielectric material.

3. The apparatus of claim 2, wherein the substrate includes silicon oxide ($SiO_2$).

4. The apparatus of claim 1, wherein the waveguide includes a semiconductor material.

5. The apparatus of claim 4, wherein the waveguide includes silicon.

6. The apparatus of claim 1, wherein:
   the first two slots of the second portion extend from opposing edges of the waveguide and merge into the single slot; and
   the second two slots of the fourth portion branch from the single slot and extend to opposing edges of the waveguide.

7. The apparatus of claim 6, wherein:
   the first two slots are symmetric to one another across a first imaginary line that extends in a direction of light propagation in the waveguide;
   the second two slots are symmetric to one another across the first imaginary line; and
   the first two slots and the second two slots are symmetric to one another across a second imaginary line that is perpendicular to the first imaginary line.

8. The apparatus of claim 1, wherein:
   the first portion and fifth portion of the waveguide each has a length greater than or equal to 10 microns in a direction of light propagation through the waveguide;
   the second portion and the fourth portion of the waveguide each has a length greater than or equal to 50 microns in the direction of light propagation through the waveguide; and
   the third portion of the waveguide has a length greater than or equal to 200 microns in the direction of light propagation through the waveguide.

9. The apparatus of claim 1, wherein the first two slots of the second portion, the single slot of the third portion, and the second two slots of the fourth portion each have a width of 50 nanometers to 150 nanometers and a height of 100 nanometers to 300 nanometers.

10. The apparatus of claim 1, wherein the first two slots of the second portion, the single slot of the third portion, and the second two slots of the fourth portion are filled with an Electro-Optic (EO) polymer that substantially encapsulates the waveguide.

11. A method comprising:
    providing a substrate including a dielectric material; and
    forming a waveguide of a modulator device on the substrate, the waveguide including a semiconductor material and having:
      a first portion that is configured to receive light for propagation along the waveguide,
      a second portion that includes first two slots formed in the waveguide that merge into a single slot, the second portion being coupled with the first portion,
      a third portion that includes the single slot formed in the waveguide, the third portion being coupled with the second portion,
      a fourth portion that includes second two slots formed in the waveguide, the second two slots branching from the single slot, the fourth portion being coupled with the third portion, and
      a fifth portion that is configured to output the propagated light, the fifth portion being coupled with the fourth portion.

12. The method of claim 11, wherein forming the waveguide includes:
    depositing the semiconductor material of the waveguide on the substrate; and
    removing a portion of the semiconductor material to form the first two slots of the second portion, the single slot of the third portion, and the second two slots of the fourth portion.

13. The method of claim 12, wherein removing the portion of the semiconductor material includes:
    using an anisotropic etch process to etch the deposited semiconductor material.

14. The method of claim 11, wherein:
    the first two slots of the second portion extend from opposing edges of the waveguide and merge into the single slot; and
    the second two slots of the fourth portion branch from the single slot and extend to opposing edges of the waveguide.

15. The method of claim 11, further comprising:
    depositing an Electro-Optic (EO) polymer to substantially fill the first two slots of the second portion, the single slot of the third portion, and the second two slots of the fourth portion.

16. A system comprising:
    a processor configured to drive a modulator device; and
    the modulator device, the modulator device being coupled with the processor and including a waveguide, the waveguide having:

a first portion that is configured to receive light for propagation along the waveguide, a second portion that includes first two slots formed in the waveguide that merge into a single slot, the second portion being coupled with the first portion, a third portion that includes the single slot formed in the waveguide, the third portion being coupled with the second portion, a fourth portion that includes second two slots formed in the waveguide, the second two slots branching from the single slot, the fourth portion being coupled with the third portion, and a fifth portion that is configured to output the propagated light, the fifth portion being coupled with the fourth portion.

17. The system of claim 16, further comprising:

a laser light source coupled with the modulator to provide the light for propagation along the waveguide;

a connector to route light that is output from the waveguide to another processor-based system and to route light that is received from the another processor-based system; and a detector to receive the light from the connector that is received from the another processor-based system, wherein the processor is configured to process signals received from the detector.

18. The system of claim 17, further comprising:

the another processor-based system; and a fiber coupled with the connector and configured to route light from the modulator device to the another processor-based system and route light from the another processor-based system to the detector.

19. The system of claim 16 wherein:

the first two slots of the second portion extend from opposing edges of the waveguide and merge into the single slot; and the second two slots of the fourth portion branch from the single slot and extend to opposing edges of the waveguide.

20. The system of claim 16, wherein the system is a handheld computing device, a tablet, or a smartphone.

* * * * *